US012188773B2

(12) United States Patent
Lee

(10) Patent No.: US 12,188,773 B2
(45) Date of Patent: Jan. 7, 2025

(54) APPARATUS AND METHOD FOR DETERMINING OF CORRECTION INFORMATION OF VEHICLE SENSOR

(71) Applicant: SK TELECOM CO., LTD., Seoul (KR)

(72) Inventor: Seongsoo Lee, Seoul (KR)

(73) Assignee: SK TELECOM CO., LTD., Seoul (KR)

( * ) Notice: Subject to any disclaimer, the term of this patent is extended or adjusted under 35 U.S.C. 154(b) by 204 days.

(21) Appl. No.: 17/467,201

(22) Filed: Sep. 4, 2021

(65) Prior Publication Data

US 2021/0396527 A1 Dec. 23, 2021

Related U.S. Application Data

(63) Continuation of application No. PCT/KR2020/002976, filed on Mar. 2, 2020.

(30) Foreign Application Priority Data

Mar. 7, 2019 (KR) ........................ 10-2019-0026434

(51) Int. Cl.
*G01C 21/30* (2006.01)
*B60W 40/105* (2012.01)
(Continued)

(52) U.S. Cl.
CPC ........... *G01C 21/30* (2013.01); *B60W 40/105* (2013.01); *B60W 40/114* (2013.01); *G08G 1/052* (2013.01); *B60W 2420/403* (2013.01); *G05D 1/0274* (2013.01)

(58) Field of Classification Search
CPC .......... G01C 21/30; G01C 25/00; G08G 1/05; G08G 1/167; G05D 1/0274; G06V 20/56;
(Continued)

(56) References Cited

U.S. PATENT DOCUMENTS 9,528,834 B2 * 12/2016 Breed ................. B60R 21/0132
10,275,550 B2 * 4/2019 Lee ...................... A01B 79/005
(Continued)

FOREIGN PATENT DOCUMENTS

CN 102565832 A * 7/2012 ............. G01C 21/30
JP 2011-252760 A 12/2011
(Continued)

OTHER PUBLICATIONS

Office Action in Korean Application No. 10-2019-0026434 dated Mar. 22, 2023 and English translation.

*Primary Examiner* — Stephen Holwerda
*Assistant Examiner* — Christopher Scott
(74) *Attorney, Agent, or Firm* — WTA Patents

(57) ABSTRACT

In accordance with an aspect of the present disclosure, there is provided a vehicle sensor correction information determining method comprising: acquiring estimated location information of a vehicle based on matching information between a camera image photographed by a camera of the vehicle and a landmark on a precise map; and determining a scale factor for a wheel speed sensor based on an estimated travel distance calculated based on the acquired estimated location information of the vehicle and a travel distance of the vehicle detected by the wheel speed sensor of the vehicle.

18 Claims, 9 Drawing Sheets

START

ACQUIRING ESTIMATED LOCATION INFORMATION OF VEHICLE BASED ON MATCHING INFORMATION BETWEEN CAMERA IMAGE PHOTOGRAPHED BY CAMERA OF VEHICLE AND LANDMARK ON PRECISE MAP — S100

DETERMINING SCALE FACTOR FOR WHEEL SPEED SENSOR BY USING ESTIMATED TRAVEL DISTANCE ACQUIRED BASED ON ESTIMATED LOCATION INFORMATION OF VEHICLE AND TRAVEL DISTANCE OF VEHICLE DETECTED BY WHEEL SPEED SENSOR OF VEHICLE — S200

DETERMINING BIAS FOR YAW RATE SENSOR OF VEHICLE BASED ON LANE INFORMATION ACCORDING TO ESTIMATED LOCATION INFORMATION OF VEHICLE ON PRECISE MAP — s300

END

(51) Int. Cl.
*B60W 40/114* (2012.01)
*G05D 1/00* (2024.01)
*G08G 1/052* (2006.01)

(58) Field of Classification Search
CPC . G06V 10/759; B60W 40/105; B60W 40/114; B60W 50/00; B60W 2556/50; B60W 2400/00; B60W 2420/42; B60W 2520/14; B60W 2520/28; B60W 2530/18; B60Y 2400/3032
See application file for complete search history.

(56) References Cited

U.S. PATENT DOCUMENTS

| | | | | |
|---|---|---|---|---|
| 10,440,271 | B2 * | 10/2019 | Ramalingam | H04N 19/513 |
| 10,455,226 | B2 * | 10/2019 | Thomson | G06T 7/74 |
| 10,829,149 | B1 * | 11/2020 | Garimella | G05D 1/0212 |
| 10,870,448 | B2 * | 12/2020 | Kunihiro | B60W 10/20 |
| 11,087,200 | B2 * | 8/2021 | Olson | G06N 7/01 |
| 2012/0116676 | A1 * | 5/2012 | Basnayake | G01S 19/485<br>701/472 |
| 2016/0290810 | A1 | 10/2016 | Zhi et al. | |
| 2020/0331499 | A1 * | 10/2020 | Watanabe | G01C 21/3407 |

FOREIGN PATENT DOCUMENTS

| | | | | |
|---|---|---|---|---|
| JP | 5425713 | B2 | | 2/2014 |
| KR | 10-2008-0029080 | A | | 4/2008 |
| KR | 10-2011-0060315 | A | | 6/2011 |
| KR | 101878685 | | * | 7/2018 |
| KR | 101878685 | B1 | * | 7/2018 |
| KR | 10-2018-0137904 | A | | 12/2018 |
| KR | 20180137904 | A | * | 12/2018 |

* cited by examiner

APPARATUS AND METHOD FOR DETERMINING OF CORRECTION INFORMATION OF VEHICLE SENSOR

CROSS-REFERENCE TO RELATED APPLICATIONS

This application is bypass continuation-in-part application of International Patent Application No. PCT/KR2020/002976, filed on Mar. 2, 2020, which claims priority to Republic of Korea Patent Application No. 10-2019-0026434, filed on Mar. 7, 2019, which are incorporated by reference herein in their entirety.

TECHNICAL FIELD

The present disclosure relates to an apparatus and a method for acquiring correction information for correcting correct a vehicle sensor. For reference, this application claims priority to Korean Patent Application No. 10-2019-0026434, filed on Mar. 7, 2019. The entire contents of the application on which the priority is based are incorporated herein by reference.

BACKGROUND

In general, a vehicle means a transportation machine driving roads or tracks using fossil fuel, electricity, and the like as a power source.

The vehicle has been developed to provide various functions to a driver according to development of technology. Particularly, according to the trend of vehicle electrification, a vehicle with an Active Safety System (ASS) that operates to prevent an accident immediately before or at the time of the accident has appeared.

Further, in recent years, in order to alleviate burdens on the driver and to enhance convenience of the driver, research on a vehicle with an Advanced Driver Assistance System (ADAS) that actively provides information on a driving environment, such as vehicle condition, the driver's condition, and a surrounding environment is being actively conducted.

Since the ADAS operates according to the driving environment determined by a location of the vehicle, it is necessary to accurately estimate the location of the vehicle in advance. Conventionally, a method of estimating the location of the vehicle by using a satellite signal has been widely used, but recently, studies on a method of considering various information with the satellite signal to increase accuracy are actively underway.

For example, the ADAS may estimate location information of the vehicle by using a travel distance of the vehicle detected by a wheel speed sensor mounted on the vehicle or by using attitude information detected by a yaw rate sensor mounted on the vehicle.

SUMMARY

The problem to be solved by the present disclosure is to provide a vehicle sensor correction information determining apparatus and method for determining a scale factor for a wheel speed sensor and bias for a yaw rate sensor based on estimated location information of a vehicle acquired by matching a camera image with a precise map.

In accordance with an aspect of the present disclosure, there is provided a vehicle sensor correction information determining method comprising: acquiring estimated location information of a vehicle based on matching information between a camera image photographed by a camera of the vehicle and a landmark on a precise map; and determining a scale factor for a wheel speed sensor based on an estimated travel distance calculated based on the acquired estimated location information of the vehicle and a travel distance of the vehicle detected by the wheel speed sensor of the vehicle.

Also, the determining the scale factor for the wheel speed sensor includes: selecting two pieces of estimated location information, from among the acquired estimated location information of the vehicle, in which a diagonal component of covariance is less than or equal to a threshold value and the estimated travel distance is greater than or equal to a threshold distance; and acquiring the scale factor for the wheel speed sensor based on the travel distance of the vehicle detected by the wheel speed sensor of the vehicle and the estimated travel distance calculated according to the two pieces of selected estimated location information.

Also, the determining the scale factor for the wheel speed sensor includes: storing a plurality of candidate scale factors acquired based on a plurality of different pieces of estimated location information; acquiring an average of a predetermined reference number of many candidate scale factors, among the plurality of the candidate scale factors, in an order in which stored time is adjacent to current time; and determining the acquired average of the candidate scale factors as the scale factor for the wheel speed sensor.

In accordance with another aspect of the present disclosure, there is provided a vehicle sensor correction information determining method comprising: acquiring estimated location information of a vehicle based on matching information between a camera image photographed by a camera of the vehicle and a landmark on a precise map; and determining bias for a yaw rate sensor of the vehicle based on lane information determined according to the acquired estimated location information of the vehicle on the precise map.

Also, the determining the bias for the yaw rate sensor of the vehicle includes: determining whether the vehicle exists on a flatland based on the lane information; acquiring a yaw rate sensor value of the vehicle when the vehicle stops if the vehicle exists on the flatland; and determining the bias for the yaw rate sensor based on the acquired yaw rate sensor value.

Also, the determining whether the vehicle exists on the flatland includes: acquiring plane information for ground based on the lane information; and determining whether the vehicle exists on the flatland based on the acquired plane information.

Also, the determining whether the vehicle exists on the flatland based on the plane information is determining that the vehicle exists on the flatland if a difference between a normal vector among the plane information and a predetermined reference vector is less than or equal to a threshold difference.

Also, the acquiring the yaw rate sensor value of the vehicle is acquiring the yaw rate sensor value of the vehicle if a diagonal component of covariance for the acquired estimated location information of the vehicle is less than or equal to a threshold value.

Also, the acquiring the yaw rate sensor value of the vehicle is acquiring a plurality of yaw rate sensor values of the vehicle at a plurality of times when the vehicle stops.

Also, the determining the bias for the yaw rate sensor based on the acquired yaw rate sensor value includes: generating a histogram for a plurality of the acquired yaw rate sensor values; determining a reference section based on an accumulated value in the generated histogram; and determining an average of yaw rate sensor values in the reference section as the bias for the yaw rate sensor.

Also, the acquiring the estimated location information of the vehicle includes: acquiring initial location information of the camera by matching the landmark on the precise map corresponding to initial location information of the vehicle based on a GPS onto the camera image; acquiring estimated location information of the camera based on matching information between the camera image and the landmark on the precise map corresponding to each of a plurality of candidate location information sampled based on the initial location information of the camera and driving information of the vehicle; and acquiring estimated location information of the vehicle based on the estimated location information of the camera.

In accordance with an aspect of the present disclosure, there is provided a vehicle sensor correction information determining apparatus comprising: an estimated location acquiring unit configured to acquire estimated location information of a vehicle based on matching information between a camera image photographed by a camera of the vehicle and a landmark on a precise map; and a scale factor determining unit configured to determine a scale factor for a wheel speed sensor based on an estimated travel distance calculated based on the acquired estimated location information of the vehicle and a travel distance of the vehicle detected by the wheel speed sensor of the vehicle.

In accordance with another aspect of the present disclosure, there is provided a vehicle sensor correction information determining apparatus comprising:

an estimated location acquiring unit configured to acquire estimated location information of a vehicle based on matching information between a camera image photographed by a camera of the vehicle and a landmark on a precise map; and a bias determining unit configured to determine bias for a yaw rate sensor of the vehicle based on lane information determined according to the acquired estimated location information of the vehicle on the precise map.

According to an embodiment of the present disclosure, the correction information for correction of the wheel speed sensor and the yaw rate sensor may be accurately determined, thereby increasing accuracy of vehicle location estimation. In particular, the scale factor for the wheel speed sensor may be determined irrespective of tire pressure, and the bias for the yaw rate sensor may be determined irrespective of disturbances such as operating time and internal temperature, thereby accurately correcting a detecting result of a vehicle sensor.

As a result, if the result of estimating the location of the vehicle through matching of the camera image and the precise map is not accurate, the location of the vehicle may be accurately estimated by a vehicle sensor including the wheel speed sensor and the yaw rate sensor. Through this, the driving convenience and driving safety for the driver may be increased by increasing accuracy not only of the ADAS but also of control of the autonomous vehicle.

In addition, it is possible to improve the detection performance of a sensor mounted on a conventional vehicle without an additional sensing means, thereby reducing manufacturing cost.

DETAILED DESCRIPTION

The advantages and features of embodiments and methods of accomplishing these will be clearly understood from the following description taken in conjunction with the accompanying drawings. However, embodiments are not limited to those embodiments described, as embodiments may be implemented in various forms. It should be noted that the present embodiments are provided to make a full disclosure and also to allow those skilled in the art to know the full range of the embodiments. Therefore, the embodiments are to be defined only by the scope of the appended claims.

In describing the embodiments of the present disclosure, if it is determined that detailed description of related known components or functions unnecessarily obscures the gist of the present disclosure, the detailed description thereof will be omitted. Further, the terminologies to be described below are defined in consideration of functions of the embodiments of the present disclosure and may vary depending on a user's or an operator's intention or practice. Accordingly, the definition thereof may be made on a basis of the content throughout the specification.

Figure 1:
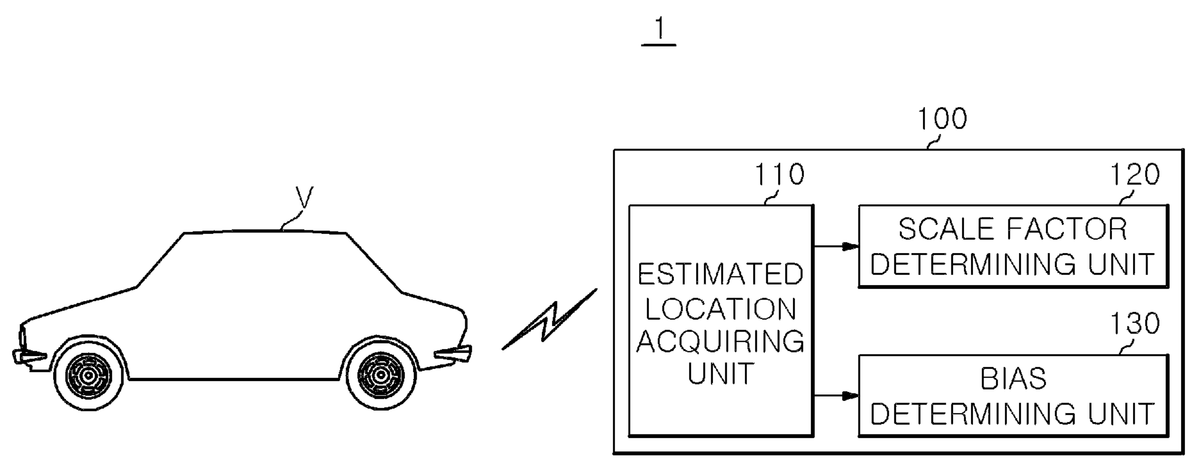
FIG. 1 shows a control block diagram of a vehicle sensor correction information determining system according to an embodiment of the present disclosure.
Figure 2:
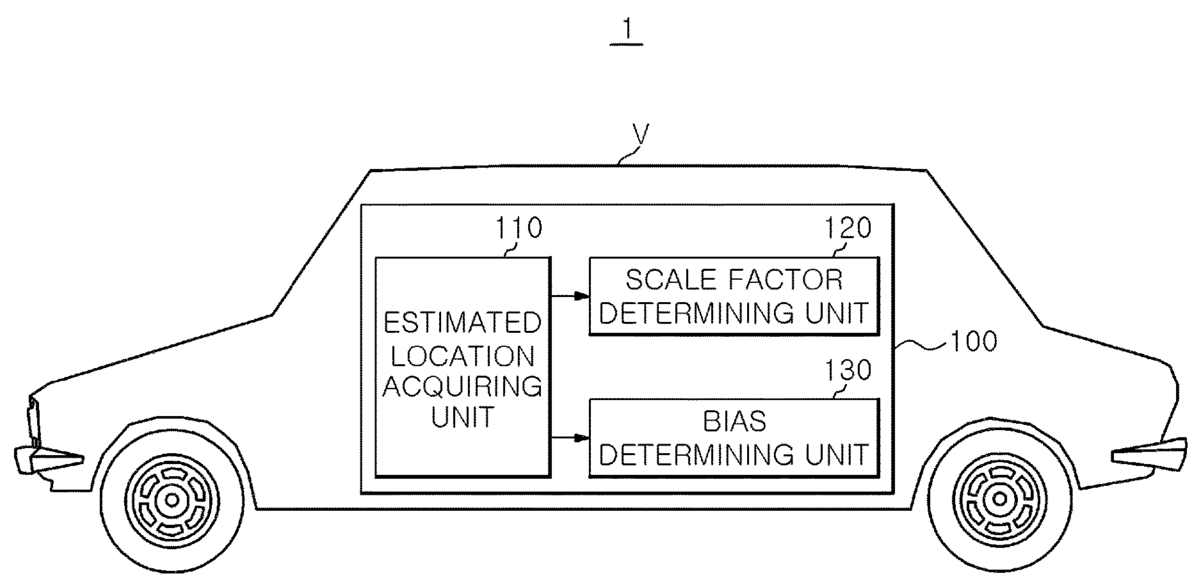
FIG. 2 shows a control block diagram of a vehicle sensor correction information determining system sensor according to another embodiment of the present disclosure.

FIGS. 1 and 2 show control block diagrams of a vehicle sensor correction information determining system 1 according to various embodiments of the present disclosure.

Referring to FIG. 1, the vehicle sensor correction information determining system 1 according to an embodiment may include a vehicle V and a vehicle sensor correction information determining apparatus 100.

The vehicle V may indicate a transportation means capable of moving humans, objects, or animals from one location to another location while running along a road or a track. The vehicle V according to an embodiment may include a vehicle with three wheels or a vehicle with four wheels, a vehicle with two wheels such as a motorcycle, a construction machine, a motor bicycle, a bicycle, and a train running on the track, and the like.

The vehicle V of FIG. 1 may include a Global Position System (GPS) module, and thus may receive a satellite signal including navigation data from at least one GPS satellite. The vehicle V may acquire a current location of the GPS-based vehicle V and a travel direction of the vehicle V based on the satellite signal.

Further, the vehicle V of FIG. 1 may store a precise map in advance. Herein, the precise map may indicate a map that has high accuracy for safe and precise control over the vehicle V, and include information on an altitude, slope, curvature, and the like, as well as a planar location of the road. In addition, the precise map may further include information on road facilities such as traffic lanes, road signs, traffic lights, a guardrail, and the like.

In addition, the vehicle V of FIG. 1 may include an Advanced Driver Assistance System (ADAS). Herein, the ADAS may indicate a system that provides information on a driving environment such as condition of the vehicle V, condition of the driver, and surrounding environment information or actively controls the vehicle V to reduce a burden on the driver and enhance convenience.

The ADAS included in the vehicle V may include a driving environment sensing means for detecting the driving environment of the vehicle V. The driving environment sensing means according to one embodiment may include radar that detects the driving environment by emitting a pulse around the vehicle V and receiving an echo pulse reflected from an object located in a corresponding direction, LiDAR that emits a laser around the vehicle V and receives an echo laser reflected from an object located in a corresponding direction, and/or an ultrasonic sensor that emits an ultrasonic wave around the vehicle V and receives an echo ultrasonic wave reflected from an object located in a corresponding direction, and the like.

In addition, the ADAS may include a camera as the sensing means. The camera may be provided to face forward, sideways, and/or rearward from the vehicle V, and thus may photograph a camera image in a corresponding direction. The photographed camera image may be a basis for acquiring information such as the traffic lane or the road sign, as well as an object around the vehicle V through image processing.

The current location of the vehicle V may be estimated by matching the acquired camera image with the above-described precise map. At this time, in order to increase accuracy of the location estimation, behavior information of the vehicle V may be referred to. To this end, the vehicle V may be equipped with, as a behavior information detecting sensor, a wheel speed sensor that detects a travel distance of the vehicle V and/or a yaw rate sensor that detects attitude information of the vehicle V based on a rotational speed of the wheel of the vehicle V.

On the other hand, detection accuracy of the behavior information detecting sensor that is mounted on the vehicle V in order to detect the behavior information may be changed by an internal factor of the sensor and/or the behavior information detecting environment. For example, among the behavior sensors, the wheel speed sensor is affected by air pressure of a tire mounted on the wheel, and thus an error may occur in an output sensor value. In addition, an internal bias value of the yaw rate sensor among the behavior sensors may be changed by disturbances such as operating time and internal temperature.

Therefore, when estimating the location of the vehicle V referring to the behavior information, the behavior information detected by the behavior information detecting sensor may be corrected by using the correction information for reducing the above-described error. To this end, the vehicle sensor correction information detecting system 1 according to an embodiment of the present disclosure may determine a scale factor as the correction information for the wheel speed sensor among the behavior information detecting sensors mounted on the vehicle V, and determine the bias as the correction information for the yaw rate sensor among the behavior information detecting sensors.

Referring back to FIG. 1, the vehicle sensor correction information determining apparatus 100 according to an embodiment of the present disclosure may determine the correction information of the vehicle sensor by using information received from the vehicle V. Herein, the correction information may include the scale factor for the wheel speed sensor and the bias for the yaw rate sensor.

In order to acquire the correction information, the vehicle sensor correction information determining apparatus 100 may exchange information by communicating with the vehicle V in various publicly known communication methods. The vehicle sensor correction information determining apparatus 100 according to an embodiment may communicate with the vehicle V through a base station by adopting a publicly known communication method such as CDMA, GSM, W-CDMA, TD-SCDMA, WiBro, LTE, EPC, and the like. Alternatively, the vehicle sensor correction information determining apparatus 100 according to another embodiment may communicate with the vehicle V within a predetermined distance by adopting a communication method such as a wireless LAN, Wi-Fi, Bluetooth, Zigbee, Wi-Fi Direct (WFD), Ultra-Wide Band (UWB), Infrared Data Association (IrDA), Bluetooth Low Energy (BLE), Near Field Communication (NFC), and the like. However, the method in which the vehicle sensor correction information determining apparatus 100 communicates with the vehicle V is not limited to the embodiments described above.

The vehicle sensor correction information determining apparatus 100 may acquire estimated location information of the vehicle V based on the information received from the vehicle V, and determine the scale factor for the wheel speed sensor and the bias information for the yaw rate sensor from the acquired estimated location information. To this end, the vehicle sensor correction information determining apparatus 100 may include an estimated location acquiring unit 110, a scale factor determining unit 120, and a bias determining unit 130.

The estimated location acquiring unit 110 may acquire the estimated location information of the vehicle V based on matching information between the camera image photographed by the camera of the vehicle V and a landmark on the precise map. Herein, the estimated location information may indicate location information acquired based on the matching information between the camera image and the landmark on the precise map, and the location information may include location coordinates and an attitude angle.

The scale factor determining unit 120 may determine the scale factor for the wheel speed sensor by using an estimated travel distance acquired based on the estimated location information of the vehicle V and the travel distance of the vehicle V detected by the wheel speed sensor of the vehicle V. Herein, the scale factor may be defined as a ratio of the estimated travel distance acquired based on the estimated location information of the vehicle V and the travel distance of the vehicle V detected by the wheel speed sensor of the vehicle V.

The bias determining unit 130 may acquire lane information based on the estimated location information of the vehicle V. In other words, the bias determining unit 130 may estimate a location of the vehicle V on the precise map by inputting the estimated location information of the vehicle V acquired based on the matching between the camera image photographed by the camera of the vehicle V and the landmark on the precise map onto the precise map, and may acquire the lane information pre-input on the precise map according to the estimated location on the precise map.

When it is determined that the vehicle V stops on a flatland based on the lane information determined according to the estimated location information of the vehicle Von the precise map, the bias determining unit 130 may determine the bias for the yaw rate sensor of the vehicle V.

Each component of the vehicle sensor correction information determining apparatus 100 according to an embodiment of the present disclosure may be implemented as a computing device including a microprocessor, for example, a Central Processing Unit (CPU), a Graphic Processing Unit (GPU), or the like. Alternatively, a plurality of components constituting the vehicle sensor correction information determining apparatus 100 may be implemented as a single SOC (System On Chip).

On the other hand, FIG. 1 illustrates a case in which the vehicle sensor correction information determining apparatus 100 is provided separately from the vehicle V to configure the vehicle sensor correction information determining system 1, but, alternatively, the vehicle sensor correction information determining apparatus 100 may be provided inside the vehicle V.

Referring to FIG. 2, the vehicle sensor correction information determining system 1 according to another embodiment of the present disclosure may be configured by the vehicle V including the vehicle sensor correction information determining apparatus 100. However, except for the way in which the vehicle sensor correction information determining apparatus 100 is provided, the operation of the vehicle sensor correction information determining system 1 of the of FIG. 1 is the same as the vehicle sensor correction information determining system 1 of FIG. 2.

Heretofore, each component of the vehicle sensor correction information determining system 1 has been described. Hereinafter, a vehicle sensor correction information determining method performed by the above-described vehicle sensor correction information determining apparatus 100 will be described.

Figure 3:
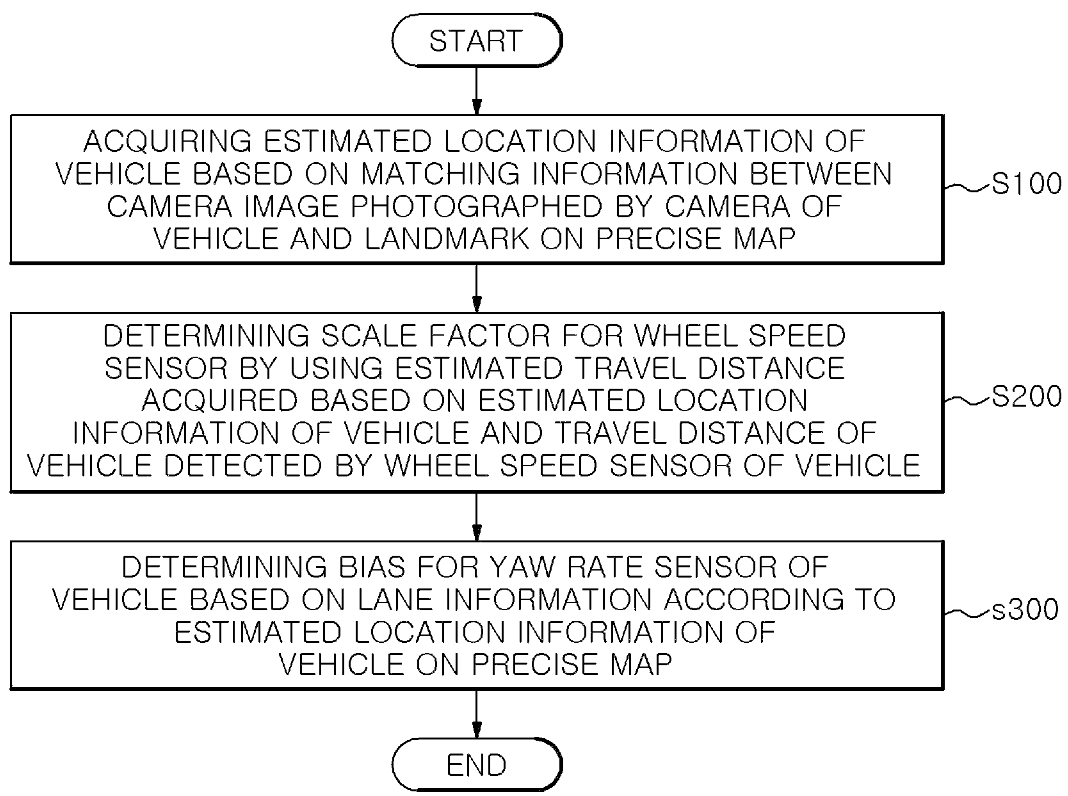
FIG. 3 shows a flowchart illustrating a vehicle sensor correction information determining method according to an embodiment of the present disclosure.

FIG. 3 shows a flowchart illustrating a vehicle sensor correction information determining method according to an embodiment of the present disclosure.

First, in a step S100, the vehicle sensor correction information determining apparatus 100 may acquire the estimated location information of the vehicle V based on the matching information between the camera image photographed by the camera of the vehicle V and the landmark on the precise map. Specifically, the estimated location acquiring unit 110 of the vehicle sensor correction information determining apparatus 100 may acquire the estimated location information of the vehicle V according to the method of FIG. 4.

Figure 4:
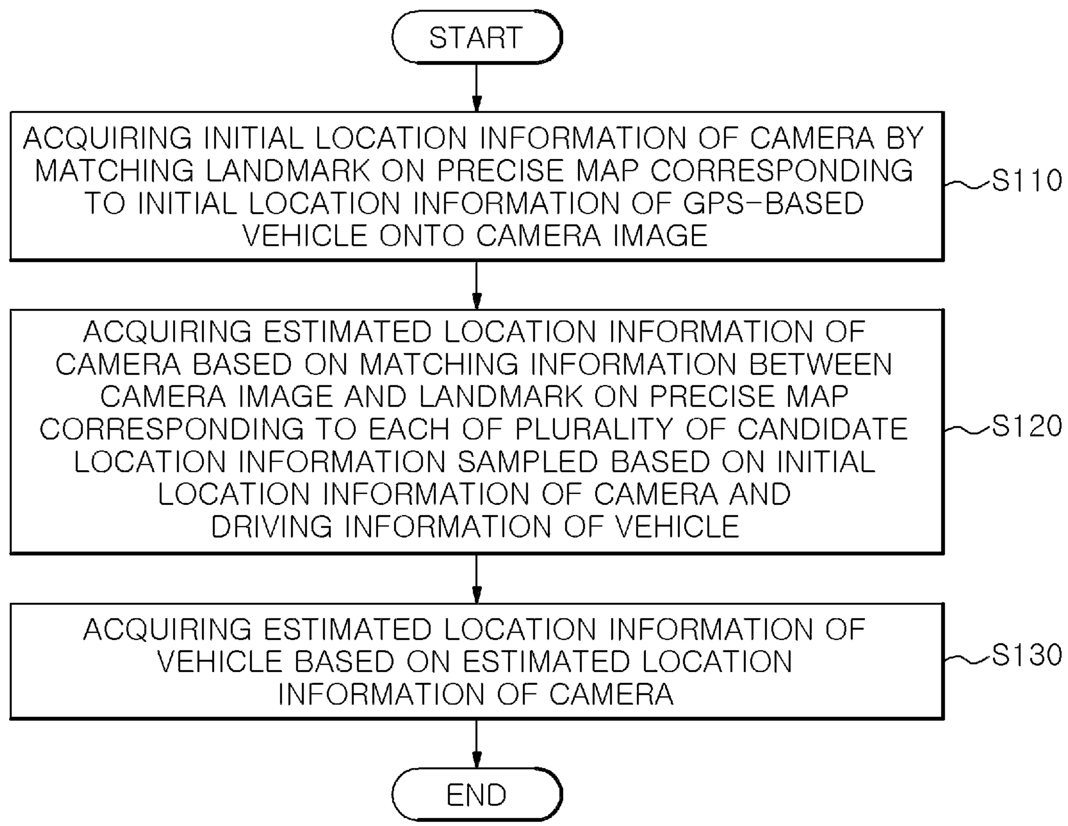
FIG. 4 shows a flowchart illustrating a method of acquiring estimated location information of a vehicle according to an embodiment of the present disclosure.
Figure 5:
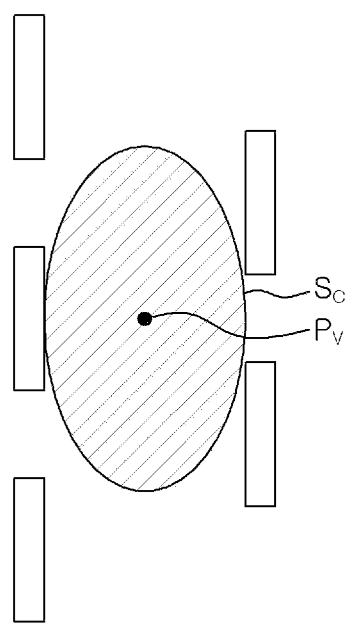
FIG. 5 shows a diagram illustrating estimated location information of a vehicle acquired by an estimated location acquiring unit according to an embodiment of the present disclosure.

FIG. 4 shows a flowchart illustrating a method of acquiring estimated location information of the vehicle V according to an embodiment of the present disclosure, and FIG. 5 shows a diagram illustrating estimated location information of the vehicle V acquired by the estimated location acquiring unit 110 according to an embodiment of the present disclosure.

In a step S110, the estimated location acquiring unit 110 may acquire initial location information of the camera by matching a landmark on a precise map corresponding to the initial location information of the GPS-based vehicle V onto a camera image. To this end, the estimated location acquiring unit 110 may first acquire the initial location information of the GPS-based vehicle V determined based on a satellite signal. The estimated location acquiring unit 110 according to an embodiment of the present disclosure may receive the initial location information including an initial location and an initial attitude angle of the GPS-based vehicle V from the vehicle V. Alternatively, the estimated location acquiring unit 110 according to another embodiment may receive only the initial location of the GPS-based vehicle from the vehicle V, and may acquire the initial location information including the initial attitude angle of the vehicle V by using this.

After acquiring the initial location information of the GPS-based vehicle V, the estimated location acquiring unit 110 may match the landmark on the precise map corresponding to the initial location information onto the camera image. Specifically, the estimated location acquiring unit 110 may determine a first region of interest based on the initial location information of the GPS-based vehicle V on the precise map. For example, the estimated location acquiring unit 110 may determine, as the first region of interest, an area within a first radius based on the initial location information of the GPS-based vehicle V. For example, the first radius may be several meters or less.

When the first region of interest is determined, the estimated location acquiring unit 110 may acquire the initial attitude angle of the camera by matching a first landmark for a traffic lane existing on the first region of interest onto the camera image photographed by the camera. Specifically, the estimated location acquiring unit 110 may acquire a rotation matrix R according to the initial attitude angle of the camera according to Equation 1.

$$S^* = \underset{T}{\operatorname{argmin}} \sum_k (Z_k - h(T, R, P_k))^T \left(C_{Z_k} + HC_{P_K}H^T\right)^{-1} (Z_k - h(T, R, P_k)) \quad \text{Equation 1}$$

Herein, a solution S* of Equation 1 may indicate the initial location information including the rotation matrix R for the initial attitude angle of the camera and a translation matrix T for the initial location of the camera. $Z_k$ may indicate coordinates of the traffic lane detected from the camera image, and $P_k$ may indicate coordinates of a landmark on the precise map corresponding to $Z_k$. $C_{Zk}$ and $C_{Pk}$ may each indicate covariance representing an error for $Z_k$ and $P_k$, and H may indicate a partial derivative of a function h( ) (which is a Jacobian matrix). In addition, the function h( ) may indicate a function projecting the coordinates of the landmark on the precise map onto the camera image, which may be defined according to Equation 2.

$$h(T,R,P)=K(R\times P+T) \quad \text{Equation 2}$$

Herein, T may indicate the translation matrix for the initial location of the camera, R may indicate the rotation matrix for the initial attitude angle of the camera, and P may indicate coordinates of the landmark on the precise map. K may indicate an intrinsic parameter matrix of the camera for projecting coordinates based on a camera coordinate system onto the camera image photographed by the camera.

To acquire the solution S* of Equation 1, the estimated location acquiring unit 110 may select at least one of publicly known algorithms, for example, a Gauss Newton algorithm or a Levenberg-Marquardt algorithm.

Covariance for a feature point of a Point Cloud Set of a landmark extending in one direction such as a traffic lane may have an elliptical shape formed in the extending direction of the traffic lane. Based on this, the estimated location acquiring unit 110 may match the first landmark onto the camera image by repeatedly calculating the solution of Equation 1 by using the feature points closest to each other as a corresponding relationship.

When Equation 1 is calculated to match the first landmark for the traffic lane extending in one direction onto the camera image, an error in a vertical direction in which the traffic lane extends may be large, whereas an error in a horizontal direction may be small. As a result, the rotation matrix R for the initial attitude angle of the camera may have reliable accuracy.

On the other hand, the translation matrix T for the initial location of the camera may be inaccurate compared to the rotation matrix R. Therefore, the estimated location acquiring unit 110 may acquire the translation matrix T for the initial location of the camera by matching a second landmark other than the traffic lane onto the camera image. Specifically, the estimated location acquiring unit 110 may determine a second region of interest based on the initial location information of the GPS-based vehicle V on the precise map. For example, the estimated location acquiring unit 110 may determine an area within a second radius that is equal to or greater than the first radius as the second region of interest based on the initial location information of the GPS-based vehicle V. In order to accurately acquire the initial location of the camera by using the landmark within a wider range, the initial attitude angle may be acquired among the initial location information of the camera. Herein, the second radius may be several hundred meters or less.

Thereafter, the estimated location acquiring unit 110 may acquire the initial location of the camera by matching the second landmark other than the traffic lane existing on the second region of interest onto the camera image based on the initial attitude angle of the camera. Specifically, the estimated location acquiring unit 110 may acquire the translation matrix T for the initial location of the camera by inputting the previously acquired rotation matrix R for the initial attitude angle of the camera to Equation 1 to calculate.

After acquiring the initial location information of the camera according to the above-described method, in a step S120, the estimated location acquiring unit 110 may acquire estimated location information of the camera based on matching information between the camera image and a landmark on the precise map corresponding to each of a plurality of candidate pieces of location information sampled based on the initial location information of the camera and driving information of the vehicle V.

To this end, the estimated location acquiring unit 110 may perform sampling for a plurality of the candidate pieces of location information around initial location information of the camera. For example, the estimated location acquiring unit 110 according to an embodiment of the present disclosure may set the initial location information of the camera as an average, and perform sampling by using a Gaussian probability model in which error modeling is set with predetermined covariance. At this time, the Gaussian probability model may be defined as a minimum of six dimensions with three degrees of freedom for the attitude angle and three degrees of freedom for the location.

Thereafter, the estimated location acquiring unit 110 may acquire the estimated location information of the camera by using a particle filter. Specifically, the estimated location acquiring unit 110 may reflect the driving information of the vehicle V onto a plurality of the candidate pieces of location information. At this time, the estimated location acquiring unit 110 may follow Equation 3.

$$\begin{bmatrix}\hat{x}(k+1)\\ \hat{y}(k+1)\\ \hat{\theta}(k+1)\end{bmatrix}=\begin{bmatrix}\hat{x}(k)\\ \hat{y}(k)\\ \hat{\theta}(k)\end{bmatrix}+\begin{bmatrix}\frac{s_r+s_l}{2}\cos\left(\theta+\frac{s_r-s_l}{2b}\right)\\ \frac{s_r+s_l}{2}\sin\left(\theta+\frac{s_r-s_l}{2b}\right)\\ \frac{s_r-s_l}{b}\end{bmatrix} \quad \text{Equation 3}$$

Herein, a matrix [x(k); y(k); θ(k)] may indicate a location and a travel direction of the vehicle V at a time k. $S_r$ may indicate a travel distance according to right wheel speed of the vehicle V, and $S_l$ may indicate a travel distance according to left wheel speed of the vehicle V.

To this end, the estimated location acquiring unit 110 may receive the driving information including wheel speed information and yaw rate information from the vehicle V.

Thereafter, the estimated location acquiring unit 110 may weight each of a plurality of the candidate pieces of location information based on matching information between the camera image and the landmark on the precise map corresponding to each of a plurality of the candidate pieces of location information. To this end, the estimated location acquiring unit 110 may use the camera image on which the landmark is extracted.

When the first landmark and the second landmark are extracted from the camera image, the estimated location acquiring unit 110 may match the landmark on the precise map corresponding to each of a plurality of the candidate pieces of location information onto the camera image. At this time, the estimated location acquiring unit 110 may use Equation 2 for the landmark matching.

When identifying a matching error, the estimated location acquiring unit 110 may acquire a weight corresponding to the matching error. This may follow Equation 4.

$$G_\sigma(\Delta x, \Delta y)=\frac{1}{2\pi\sigma^2}e^{-\frac{\Delta x^2+\Delta y^2}{2\sigma^2}} \quad \text{Equation 4}$$

Herein, $G_\sigma$ may indicate the weight, (Δx, Δy) may indicate an error for x and y on the camera image, and σ may indicate a standard deviation.

Thereafter, the estimated location acquiring unit 110 may reflect the matching error by assigning the corresponding weight onto the corresponding candidate location information.

After assigning the weight, the estimated location acquiring unit 110 may newly perform sampling for a plurality of the candidate pieces of location information by using a plurality of the candidate pieces of location information where the weight is assigned. Since the sampling is newly performed based on the result of assigning the weight, a plurality of the candidate pieces of location information may converge around candidate location information with a small matching error.

When the sampling is completed, the estimated location acquiring unit 110 may identify whether the standard deviation of a plurality of the newly sampled candidate location information is equal to or less than a reference standard deviation. Herein, the reference standard deviation may indicate a maximum standard deviation capable of acquiring the estimated location information of the camera by using a plurality of candidate locations.

If the standard deviation of a plurality of the newly sampled candidate pieces of location information is equal to or less than the reference standard deviation, the estimated location acquiring unit 110 may acquire an average value of a plurality of the newly sampled candidate pieces of location information as the estimated location information of the camera.

On the other hand, if the standard deviation of a plurality of the newly sampled candidate location information is greater than the reference standard deviation, the estimated location acquiring unit 110 may reflect the driving information of the vehicle V onto a plurality of the newly sampled candidate location information, and then the above-describe process may be performed repeatedly.

When the estimated location information of the camera is acquired, in a step S130, the estimated location acquiring unit 110 may acquire estimated location information of the vehicle V based on the estimated location information of the camera. To this end, the estimated location acquiring unit 110 may verify whether the estimated location information of the camera is valid.

Specifically, the estimated location acquiring unit 110 may first identify the second landmark other than the traffic land among landmarks on the precise map corresponding to the estimated location information of the camera. Thereafter, the estimated location acquiring unit 110 may acquire a weight of the estimated location information of the camera corresponding to a matching error of each of the second landmarks. Herein, the weight of the estimated location information of the camera may follow Equation 4 described above.

When the weight corresponding to the matching error of each of the second landmarks is acquired, the estimated location acquiring unit 110 may identify whether the number of the weights that are equal to or greater than a reference value is equal to or greater than a reference number. Herein, the reference value may indicate a minimum weight according to a matching error where the location information of the camera may be determined as valid, and the reference number may indicate a minimum number of weights that is equal to or greater than the reference value where the location information of the camera is determined as valid.

If the number of the weights that is equal to or greater than the reference value is equal to or greater than the reference number, the estimated location acquiring unit 110 may determine the estimated location information of the camera to be valid. As a result, the estimated location acquiring unit 110 may acquire the estimated location information of the vehicle V by using the estimated location information of the camera. In this case, the estimated location acquiring unit 110 may acquire the estimated location information of the vehicle V by using the translation matrix T and the rotation matrix R.

On the other hand, if the number of the weights that is equal to or greater than the reference value is less than the reference number, the estimated location acquiring unit 110 may determine the estimated location information of the camera to be invalid. Thereafter, the estimated location acquiring unit 110 may newly acquire the initial location information of the camera, thereby performing the process of acquiring the estimated location of the vehicle V again.

Unlike the above-described method, the estimated location acquiring unit 110 according to another embodiment of the present disclosure may perform, for each frame of the camera images, the above-described verification of the validity, and may compare a verification result with a predetermined reference to verify the validity of the estimated location information of the camera. Alternatively, the estimated location acquiring unit 110 according to yet another embodiment of the present disclosure may repeatedly perform the verification while the vehicle V travels a predetermined distance, and may newly acquire initial location information of the camera if the estimated location information of the camera is invalid.

In this way, the estimated location acquiring unit 110 may monitor the estimated location information of the camera by repeatedly performing verification of the validity based on every frame of the camera images, a predetermined period, or a predetermined travel distance.

Referring to FIG. 5, the acquired estimated location information of the vehicle V may include estimated location coordinates $P_v$ and covariance $S_c$. The estimated location coordinates $P_v$ may include an estimated location and an estimated attitude angle expressed in two dimensions, and the covariance $S_c$ may be expressed as a matrix including a diagonal component representing an error of the estimated location coordinates. In this case, the covariance $S_c$ may be substituted for a yaw rate sensor value.

After acquiring the estimated location information of the vehicle V, the vehicle sensor correction information determining apparatus 100 may use this to determine a scale factor for the wheel speed sensor. Referring again to FIG. 3, in a step S200, the vehicle sensor correction information determining apparatus 100 may determine the scale factor for the wheel speed sensor by using an estimated travel distance acquired based on the estimated location information of the vehicle V and the travel distance of the vehicle V detected by the wheel speed sensor of the vehicle V. Specifically, the scale factor determining unit 120 of the vehicle sensor correction information determining apparatus 100 may determine the scale factor for the wheel speed sensor according to FIG. 6.

Figure 6:
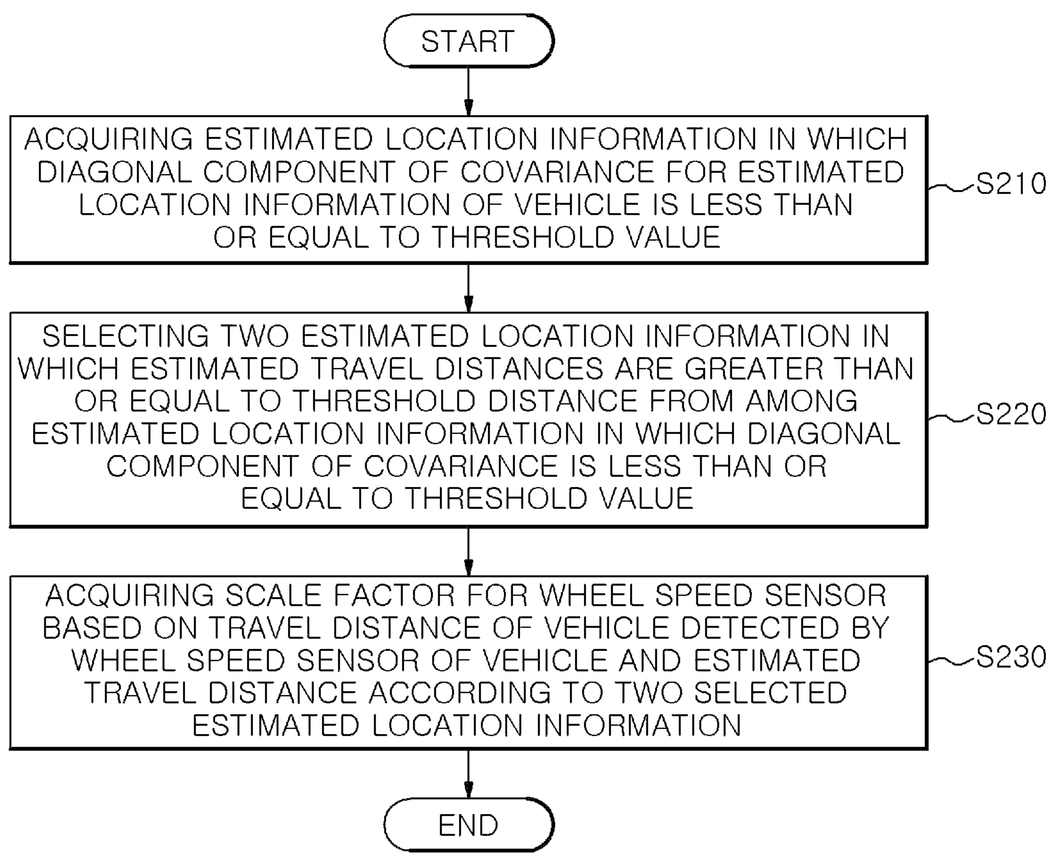
FIG. 6 shows a flowchart illustrating a scale factor determining method according to an embodiment of the present disclosure.

FIG. 6 shows a flowchart illustrating a scale factor determining method according to an embodiment of the present disclosure.

In a step S210, the scale factor determining unit 120 may first acquire estimated location information in which a diagonal component of covariance for estimated location information of the vehicle V is less than or equal to a threshold value. As described above, the small diagonal component of the covariance that is represented by a matrix may indicate that the error of the estimated location information of the vehicle V acquired is probabilistically small. As a result, accuracy of a calculated travel distance of the vehicle V for starting location coordinates and ending location coordinates for acquiring the travel distance of the vehicle V may increase as the diagonal component of the covariance decreases.

Accordingly, the scale factor determining unit 120 may compare a plurality of estimated pieces of location information acquired by the estimated location acquiring unit 110 with the threshold value, thereby acquiring estimated location information equal to or less than the threshold value. Herein, the threshold value may indicate a maximum value of covariance for reliable estimated location information.

Thereafter, in a step S220, the scale factor determining unit 120 may select two pieces of estimated location information in which estimated travel distances are greater than or equal to a threshold distance from among the estimated location information in which the diagonal component of the covariance is less than or equal to the threshold value. In order to determine the scale factor, since the travel distance of the vehicle V detected by the wheel speed sensor is compared based on the estimated travel distance according to the two pieces of estimated location information, the farther the starting location coordinates and the ending location coordinates are, the more advantageous it is.

Accordingly, the scale factor determining unit 120 may compare the threshold distance with the estimated travel distance among the estimated location information in which the diagonal component of the Covariance is less than or equal to the threshold value, and may select two pieces of estimated location information in which the diagonal component is greater than or equal to the threshold distance. Herein, the threshold distance may indicate a minimum value of the estimated travel distance that may be used to determine a reliable scale factor.

Finally, in a step S230, the scale factor determining unit 120 may acquire the scale factor for the wheel speed sensor based on the travel distance of the vehicle V detected by the wheel speed sensor of the vehicle V and the estimated travel distance according to the two pieces of selected estimated location information. Herein, the scale factor A for the wheel speed sensor may be defined by Equation 5.

$$\lambda = \frac{D_2}{D_1} \qquad \text{Equation 5}$$

Herein, $D_1$ may indicate the travel distance of the vehicle V detected by the wheel speed sensor, and $D_2$ may indicate the estimated travel distance according to the two pieces of selected estimated location information.

The wheel speed sensor may detect the travel distance based on rotational speed of the left wheel and the right wheel of the vehicle V. Specifically, the wheel speed sensor may detect an average S of a travel distance $S_l$ for the left wheel and a travel distance $S_r$ for the right wheel of the vehicle V as the travel distance $D_1$ of the vehicle V.

The scale factor determining unit 120 may acquire the scale factor λ by dividing the estimated travel distance $D_2$ according to the two pieces of selected estimated location information by the travel distance $D_1$ of the vehicle V. The acquired scale factor λ may be used later to correct the location of the vehicle V. Hereinafter, a method of correcting the location of the vehicle V by using the scale factor will be described with reference to FIG. 7.

Figure 7:
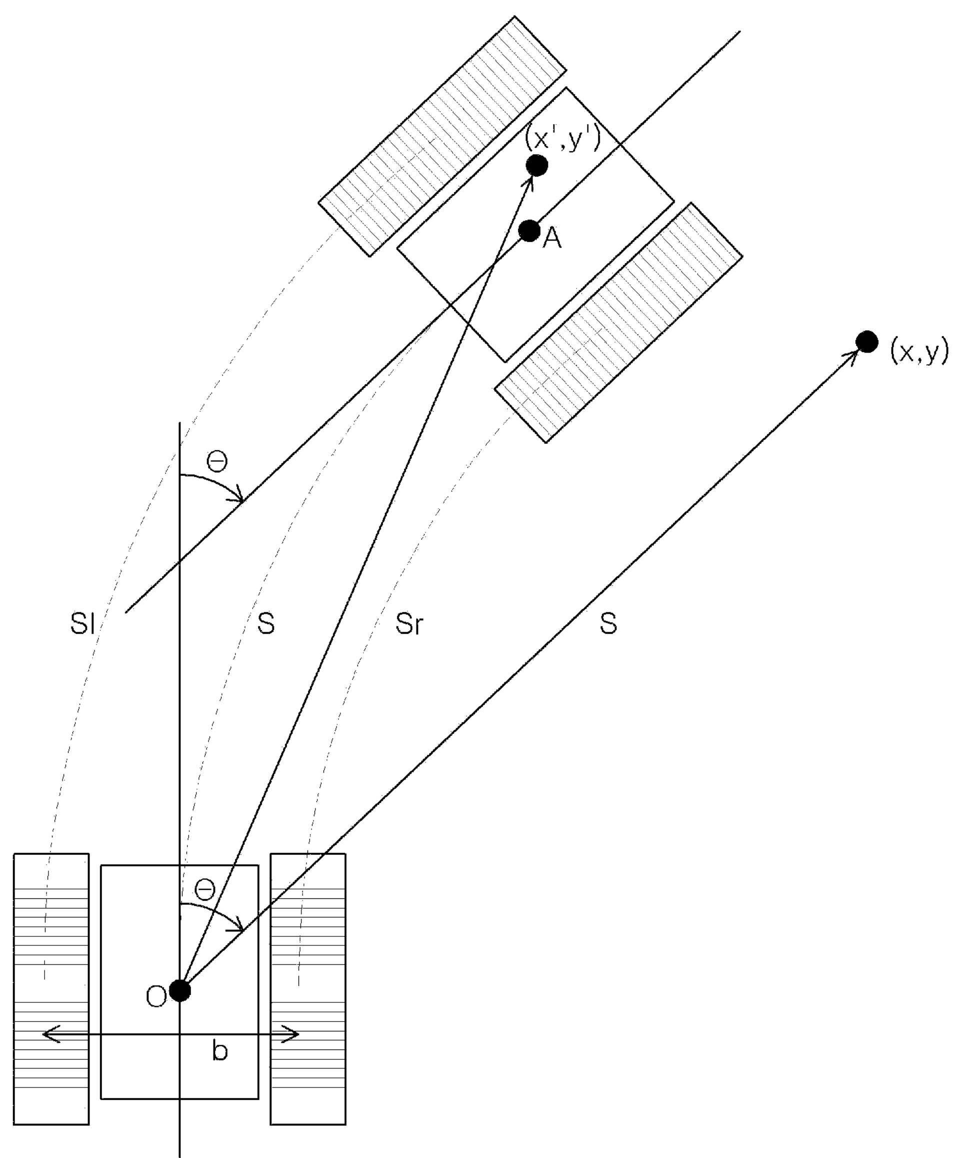
FIG. 7 shows a diagram illustrating a method of correcting a location of a vehicle by using a scale factor for a wheel speed sensor according to an embodiment of the present disclosure.

FIG. 7 shows a diagram illustrating a method of correcting a location of the vehicle V by using a scale factor for a wheel speed sensor according to an embodiment of the present disclosure.

Referring to FIG. 7, when a vehicle V with a width b located at the origin O at the time k travels on a curve to be located at A at the time k+1, a location of the vehicle V at the time k+1 may be acquired based on a detected value of the wheel speed sensor. In particular, by correcting the detected value of the wheel speed sensor by using the scale factor λ for the wheel speed sensor, the location of the vehicle V at the time k+1 may be more accurately acquired.

If the travel distance $S_l$ for the left wheel and the travel distance $S_r$ for the right wheel of the vehicle V are provided by the wheel speed sensor, the location (x', y') of the vehicle V at the time k+1 may be corrected according to Equation 6.

$$\begin{bmatrix} \hat{x}(k+1) \\ \hat{y}(k+1) \\ \hat{\theta}(k+1) \end{bmatrix} = \begin{bmatrix} \hat{x}(k) \\ \hat{y}(k) \\ \hat{\theta}(k) \end{bmatrix} + \begin{bmatrix} \frac{\lambda(s_r+s_l)}{2}\cos\left(\theta + \frac{s_r - s_l}{2b}\right) \\ \frac{\lambda(s_r+s_l)}{2}\sin\left(\theta + \frac{s_r - s_l}{2b}\right) \\ \frac{s_r - s_l}{b} \end{bmatrix} \qquad \text{Equation 6}$$

Equation 6 is derived by applying the scale factor λ for the wheel speed sensor to Equation 3, and a matrix [x(k); y(k); θ(k)] may indicate a location and a travel direction of the vehicle V at the time k. $S_r$ may indicate a travel distance according to right wheel speed of the vehicle V, and $S_l$ may indicate a travel distance according to left wheel speed of the vehicle V.

On the other hand, the scale factor determining unit 120 may determine the scale factor for the wheel speed sensor based on a plurality of different pieces of estimated location information acquired by the estimated location acquiring unit 110. To this end, the scale factor determining unit 120 may first determine candidate scale factors by using each of the different pieces of estimated location information sequentially acquired by the wheel speed sensor, and then store the candidate scale factors in the determined order.

Thereafter, the scale factor determining unit 120 may acquire an average of a predetermined reference number of the candidate scale factors in an order in which the stored time is adjacent to the current time. Herein, the reference number may indicate the number of optimal candidate scale factors to be used to determine the scale factor.

Finally, the scale factor determining unit 120 may determine the acquired average of the candidate scale factors as the scale factor for the wheel speed sensor. Whenever a new candidate scale factor is acquired, the scale factor determining unit 120 may newly determine and update the scale factor. Through this, the scale factor determining unit 120 may determine the scale factor for the wheel speed sensor in which external environmental changes such as tire pressure mounted on the wheel are reflected in real time.

Referring to FIG. 3 again, in a step S300, the vehicle sensor correction information determining apparatus 100 may determine bias for a yaw rate sensor of the vehicle V based on lane information according to the estimated location information of the vehicle V on the precise map. Specifically, the bias determining unit 130 of the vehicle sensor correction information determining apparatus 100 may determine the bias for the yaw rate sensor according to FIG. 8.

Figure 8:
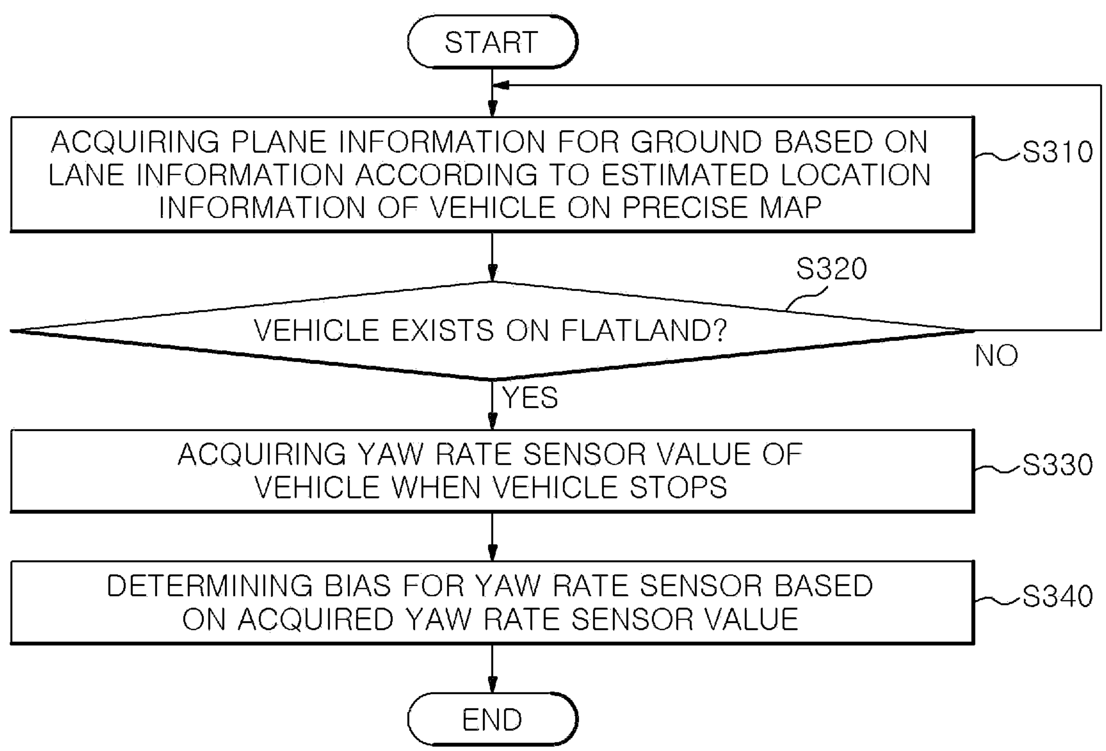
FIG. 8 shows a flowchart illustrating a bias determining method according to an embodiment of the present disclosure.
Figure 9:
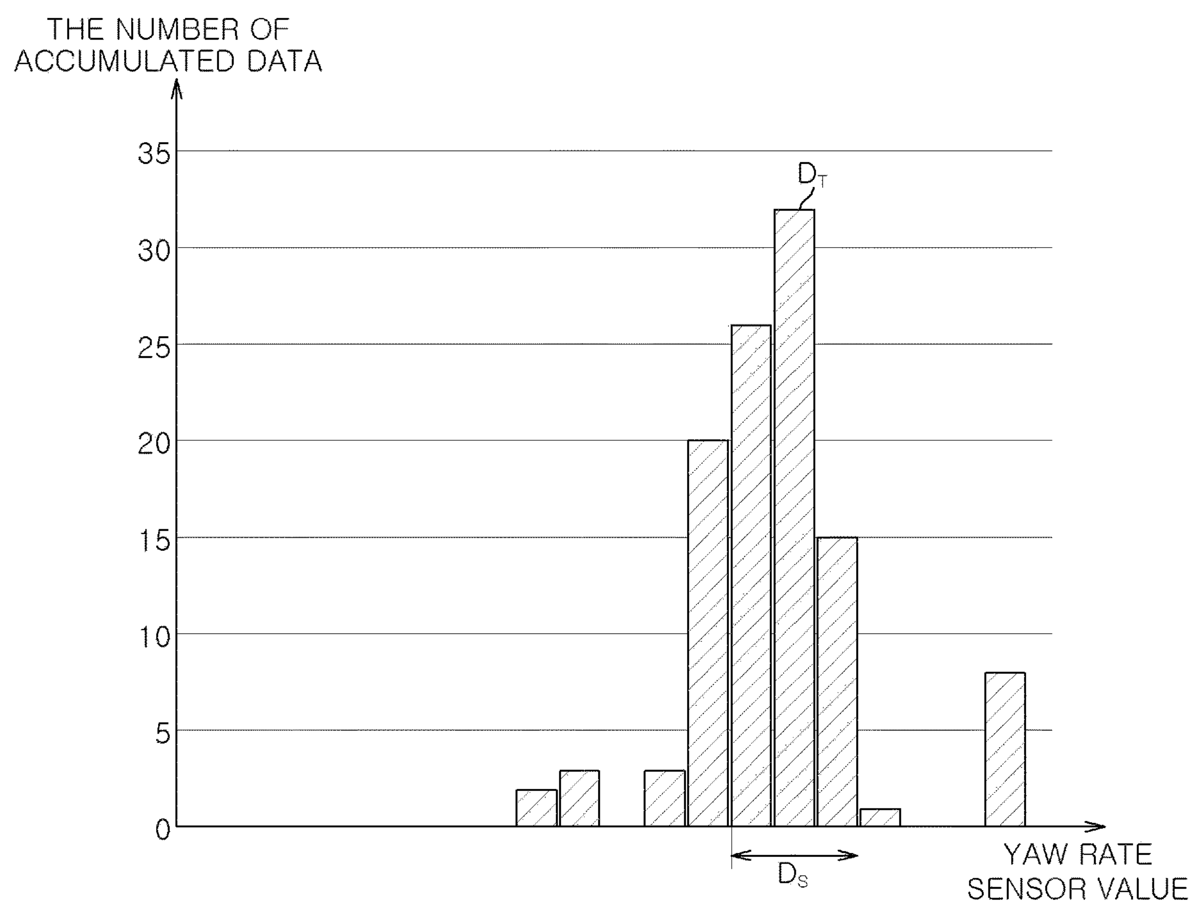
FIG. 9 shows a diagram illustrating a histogram for yaw rate sensor values according to an embodiment of the present disclosure.

FIG. 8 shows a flowchart illustrating a bias determining method according to an embodiment of the present disclosure, and FIG. 9 shows a diagram illustrating a histogram for yaw rate sensor values according to an embodiment of the present disclosure.

In a step S310, the bias determining unit 130 may first acquire plane information for the ground based on lane information according to estimated location information of the vehicle V on the precise map. To this end, the bias determining unit 130 may select, in advance, the estimated location information of the vehicle V to be used for determining the bias. As described above, since the smaller the covariance is, the higher the accuracy of the estimated position information is, the bias determining unit 130 may select estimated location information in which the diagonal component of the covariance is less than or equal to a threshold value from among the estimated position information acquired by the estimated location acquiring unit 110. Herein, the threshold value may indicate a maximum value of the covariance for reliable estimated location information.

Thereafter, the bias determining unit 130 may identify, on the precise map, the estimated location information of the vehicle V acquired by the estimated location acquiring unit 110, and then acquire lane information within a region of interest determined from the corresponding location. Herein, the region of interest may indicate a surrounding area determined from the estimated location information of the vehicle V.

The bias determining unit 130 may acquire the plane information for the ground based on the acquired lane information. To this end, the bias determining unit 130 may acquire covariance for distribution of vertices of the acquired lane information, and then acquire an eigenvector corresponding to a minimum eigenvalue according to an Eigenvalue Decomposition method. In this case, the bias determining unit 130 may determine that a selected vertical direction is reliable only when a ratio of the minimum eigenvalue and a following eigenvalue is greater than a reference eigenvalue ratio.

The acquired eigenvector may indicate a normal vector to the ground as the plane information for the ground.

Thereafter, in a step S320, the bias determining unit 130 may determine whether the vehicle V exists on a flatland based on the acquired plane information for the ground. To this end, the bias determining unit 130 may compare the normal vector among the plane information for the ground with a reference vector. Herein, the reference vector may indicate the normal vector when the ground is flatland, and may preferably be determined as [0,0,1].

If the difference between the normal vector among the plane information and the reference vector exceeds a threshold difference, the bias determining unit 130 may determine that the vehicle V exists on a slope. On the other hand, if the difference between the normal vector among the plane information and the reference vector is less than or equal to the threshold difference, the bias determining unit 130 may determine that the vehicle V does not exist on the slope. Herein, the critical difference may indicate an error range that may be regarded as the ground.

If it is determined that the vehicle V does not exist on the flatland, the bias determining unit 130 may re-acquire plane information at a different time.

Alternatively, in a step S330, if it is determined that the vehicle V exists on the flatland, the bias determining unit 130 may acquire a yaw rate sensor value of the vehicle V when the vehicle V stops. Finally, in a step S340, the bias determining unit 130 may determine the bias for the yaw rate sensor based on the acquired yaw rate sensor value.

The bias determining unit 130 according to an embodiment of the present disclosure may replace the bias for the current yaw rate sensor with the acquired yaw rate sensor value. Alternatively, the bias determining unit 130 according to another embodiment of the present disclosure may acquire a plurality of yaw rate sensor values of the vehicle V at a plurality of times when the vehicle V stops, and may acquire the bias for the yaw rate sensor based on this.

Specifically, the bias determining unit 130 may generate the histogram for a plurality of the acquired yaw rate sensor values. Referring to FIG. 9, by accumulating the acquired yaw rate sensor values, the bias determining unit 130 may generate a histogram including the number of accumulated data for each yaw rate sensor value.

Thereafter, the bias determining unit 130 may set a reference section based on the accumulated value in the generated histogram. Herein, the reference section may indicate a section of a yaw rate sensor value to be used to determine actual bias. In order to set the reference section, the bias determining unit 130 may search for a yaw rate sensor value in which the largest amount of data is accumulated. In the case of FIG. 9, the bias determining unit 130 may search for DT that is the yaw rate sensor value in which the largest amount of data is accumulated. After searching for the yaw rate sensor value in which the largest amount of data is accumulated, the bias determining unit 130 may set a predetermined section as a search section based on the searched yaw rate sensor value. In the case of FIG. 9, the bias determining unit 130 may set a search section Ds around the searched yaw rate sensor value.

Finally, the bias determining unit 130 may determine the average of the yaw rate sensor values in the reference section as the bias for the yaw rate sensor. In this case, the bias may be determined as a weighted average of the yaw rate sensor values according to the number of accumulated data in the reference section.

In addition, since the bias for the yaw rate sensor changes over time, whenever the vehicle V stops on the flatland, the bias determining unit 130 may reflect the yaw rate sensor value in the histogram. In addition, the yaw rate sensor value at the threshold time after the accumulated time may be deleted from the histogram. Through this, the bias for the yaw rate sensor may be determined based on latest data.

In addition, in order to prevent the bias from being over-fitting at a specific location, the bias determining unit 130 may limit the number of the yaw rate sensor values output at the specific location to be reflected in the histogram.

When the bias is determined according to the above-described method, the sensor value output from the yaw rate sensor may be corrected. Through this, it is possible to determine the bias for the yaw rate sensor in which disturbances such as operating time and internal temperature are reflected in real time.

According to an embodiment of the present disclosure, the correction information for correction of the wheel speed sensor and the yaw rate sensor may be accurately determined, thereby increasing accuracy of vehicle location estimation. In particular, the scale factor for the wheel speed sensor may be determined irrespective of tire pressure, and the bias for the yaw rate sensor may be determined irrespective of disturbances such as operating time and internal temperature, thereby accurately correcting a detecting result of a vehicle sensor.

As a result, if the result of estimating the location of the vehicle through matching of the camera image and the precise map is not accurate, the location of the vehicle may be accurately estimated by a vehicle sensor including the wheel speed sensor and the yaw rate sensor. Through this, the driving convenience and driving safety for the driver may be increased by increasing accuracy not only of the ADAS but also of control of the autonomous vehicle.

In addition, it is possible to improve the detection performance of a sensor mounted on a conventional vehicle without an additional sensing means, thereby reducing manufacturing cost.

On the other hand, each step of the vehicle sensor correction information determining method according to an embodiment may be implemented in a form of a computer program that is programmed to execute each step included therein and stored in a computer-readable recording medium.

The above description is merely exemplary description of the technical scope of the present disclosure, and it will be understood by those skilled in the art that various changes and modifications can be made without departing from original characteristics of the present disclosure. Therefore, the embodiments disclosed in the present disclosure are intended to explain, not to limit, the technical scope of the present disclosure, and the technical scope of the present disclosure is not limited by the embodiments. The protection scope of the present disclosure should be interpreted based on the following claims and it should be appreciated that all technical scopes included within a range equivalent thereto are included in the protection scope of the present disclosure.

According to an embodiment, the above-described apparatus and method for acquiring correction information for a vehicle sensor may be used in various fields such as a home or an industrial site, and thus have industrial applicability.

What is claimed is:

1. A vehicle sensor correction information determining method comprising:
acquiring an initial attitude angle of a camera of a vehicle by matching information between a camera image photographed by the camera and a first landmark in a first region on a precise map, the first landmark including a traffic lane;
acquiring an initial location of the camera by matching information between the camera image and a second landmark in a second region on the precise map based on the initial attitude angle of the camera, the second landmark excluding the traffic lane, the second region greater than the first region;
acquiring estimated location information of the vehicle based on the initial location of the camera and driving information of the vehicle, wherein the driving information includes wheel speed information and yaw rate information of the vehicle; and
determining a scale factor for a wheel speed sensor as a ratio of a first travel distance as estimated by the acquired estimated location information of the vehicle and a second travel distance of the vehicle as detected by the wheel speed sensor of the vehicle.

2. The method of claim 1, wherein the determining the scale factor for the wheel speed sensor includes:
selecting two locations from the acquired estimated location information of the vehicle, in which a diagonal component of covariance is less than or equal to a threshold value and the first travel distance is greater than or equal to a threshold distance; and
acquiring the scale factor for the wheel speed sensor based on the second travel distance of the vehicle detected by the wheel speed sensor of the vehicle and the first travel distance calculated according to the two selected locations.

3. The method of claim 1, wherein the determining the scale factor for the wheel speed sensor includes:
storing a plurality of candidate scale factors acquired based on the estimated location information;
acquiring an average of a subset of the candidate scale factors selected from the plurality of the candidate scale factors based on adjacency of stored times of the candidate store factors relative to a current time; and
determining the acquired average of the candidate scale factors as the scale factor for the wheel speed sensor.

4. The method of claim 1, further comprising:
acquiring initial location information of the camera by matching the first landmark on the precise map corresponding to initial location information of the vehicle based on a GPS with the camera image; and
acquiring estimated location information of the camera based on matching information between the camera image and the landmark on the precise map corresponding to each of a plurality of candidate location information sampled based on the initial location information of the camera and driving information of the vehicle, the estimated location information of the vehicle determined based on the acquired estimated location information of the camera.

5. The method of claim 1, wherein the acquiring locations of estimated location information includes:
estimating locations of the camera by matching the second landmark onto the camera image based on the acquired initial attitude angle, and
acquiring the estimated location information of the vehicle using the estimated locations of the camera.

6. A vehicle sensor correction information determining method, comprising:
acquiring an initial attitude angle of a camera of a vehicle by matching information between a camera image photographed by the camera and a first landmark in a first region on a precise map, the first landmark including a traffic lane from which lane information is derived;
acquiring an initial location of the camera by matching information between the camera image and a second landmark in a second region on the precise map based on the initial attitude angle of the camera, the second landmark excluding the traffic lane, the second region greater than the first region;
acquiring estimated location information of the vehicle based on the initial location of the camera and driving information of the vehicle, wherein the driving information includes wheel speed information and yaw rate information of the vehicle; and
determining bias for a yaw rate sensor of the vehicle based on the lane information determined according to the acquired estimated location information of the vehicle on the precise map.

7. The method of claim 6, wherein the determining the bias for the yaw rate sensor of the vehicle includes:
determining whether the vehicle exists on a flatland based on the lane information;
acquiring a yaw rate sensor value of the vehicle when the vehicle stops if the vehicle exists on the flatland; and
determining the bias for the yaw rate sensor based on the acquired yaw rate sensor value.

8. The method of claim 7, wherein the determining whether the vehicle exists on the flatland includes:
acquiring plane information for ground based on the lane information; and
determining whether the vehicle exists on the flatland based on the acquired plane information.

9. The method of claim 8, wherein the determining whether the vehicle exists on the flatland based on the plane information is determining that the vehicle exists on the flatland if a difference between a normal vector among the plane information and a predetermined reference vector is less than or equal to a threshold difference.

10. The method of claim 7, wherein the acquiring the yaw rate sensor value of the vehicle is acquiring the yaw rate sensor value of the vehicle if a diagonal component of covariance for the acquired estimated location information of the vehicle is less than or equal to a threshold value.

11. The method of claim 7, wherein the acquiring the yaw rate sensor value of the vehicle is acquiring a plurality of yaw rate sensor values of the vehicle at a plurality of times when the vehicle stops.

12. The method of claim 11, wherein the determining the bias for the yaw rate sensor based on the acquired yaw rate sensor value includes:
generating a histogram for a plurality of the acquired yaw rate sensor values;

determining a reference section based on an accumulated value in the generated histogram; and determining an average of yaw rate sensor values in the reference section as the bias for the yaw rate sensor.

13. The method of claim 6, further comprising:

acquiring initial location information of the camera by matching the first landmark on the precise map corresponding to initial location information of the vehicle based on a GPS with the camera image; and acquiring estimated location information of the camera based on matching information between the camera image and the landmark on the precise map corresponding to each of a plurality of candidate location information sampled based on the initial location information of the camera and driving information of the vehicle, the estimated location information of the vehicle determined based on the acquired estimated location information of the camera.

14. The method of claim 6, wherein the acquiring locations of estimated location information includes:

estimating locations of the camera by matching the second landmark onto the camera image based on the acquired initial attitude angle, and acquiring the estimated location information of the vehicle using the estimated locations of the camera.

15. A non-transitory computer-readable storage medium storing a computer program including computer executable instructions, wherein the instructions, when executed by a processor, cause the processor to perform a vehicle sensor correction information determining method comprising:

acquiring an initial attitude angle of a camera of a vehicle by matching information between a camera image photographed by the camera and a first landmark in a first region on a precise map, the first landmark including a traffic lane;

acquiring an initial location of the camera by matching information between the camera image and a second landmark in a second region on the precise map based on the initial attitude angle of the camera, the second landmark excluding the traffic lane, the second region greater than the first region;

acquiring estimated location information of the vehicle based on the initial location of the camera and driving information of the vehicle, wherein the driving information includes wheel speed information and yaw rate information of the vehicle; and determining a scale factor for a wheel speed sensor based on a first travel distance as estimated by the acquired estimated location information of the vehicle and a second travel distance of the vehicle as detected by the wheel speed sensor of the vehicle.

16. The non-transitory computer-readable storage medium of claim 15, wherein the determining the scale factor for the wheel speed sensor includes:

selecting two locations from the acquired locations of the estimated location information of the vehicle, in which a diagonal component of covariance is less than or equal to a threshold value and the first travel distance is greater than or equal to a threshold distance; and acquiring the scale factor for the wheel speed sensor based on the second travel distance of the vehicle detected by the wheel speed sensor of the vehicle and the first travel distance calculated according to the two selected locations.

17. The non-transitory computer-readable storage medium of claim 15, wherein the determining the scale factor for the wheel speed sensor includes:

storing a plurality of candidate scale factors acquired based on the estimated location information;

acquiring an average of a subset of the candidate scale factors selected from the plurality of the candidate scale factors based on adjacency of stored times of the candidate store factors relative to a current time; and determining the acquired average of the candidate scale factors as the scale factor for the wheel speed sensor.

18. The non-transitory computer-readable storage medium of claim 15, wherein the acquiring locations of estimated location information includes:

estimating locations of the camera by matching the second landmark onto the camera image based on the acquired initial attitude angle, and acquiring the estimated location information of the vehicle using the estimated locations of the camera.

* * * * *